United States Patent Office 3,180,887
Patented Apr. 27, 1965

---

3,180,887
N-SEC LOWER ALKYL 2-(3,5-DIACETOXYPHENYL) ETHANOLAMINE
Gerhard Zölss, Linz, Otto Schmid, Leonding, near Linz, and Karl Wismayr, Linz, Austria, assignors to Osterreichische Stickstoffwerke Aktiengesellschaft, Linz, Austria
No Drawing. Filed Sept. 4, 1962, Ser. No. 221,659
Claims priority, application Austria, Sept. 14, 1961, A 6,984/61; Germany, Nov. 17, 1961, L 40,500
4 Claims. (Cl. 260—479)

This invention relates to novel diacylated phenyl-ethanol-amines having valuable physiological properties and more particularly to 3,5-diacyloxy-phenyl-ethanol-amine salts having a prolonged hypotension-producing action and a broncholytic action, but having less effect on pulse rate compared with the known non-acylated compounds.

This invention also relates to a novel and advantageous process for the preparation of diacylated and of non-acylated N-substituted 3,5-dioxyphenyl-ethanol amines.

3,4-dioxy- and 3,5-dioxyphenyl-alkanol-amines in which the nitrogen atom bears a branched hydrocarbon radical, more particularly an iso-propyl radical, have interesting medical properties because of their sympathomimetic activity. In the conventional procedure for the preparation of such compounds, dioxy-ω-halogen-acetophenones have been reacted with primary amines and the resulting products have been hydrogenated to the carbinols. A disadvantage of this procedure is that the ω-halogen-acetophenones are very unpleasant to handle since they cause considerable irritation of the mucosae, more particularly the mucosae of the eyes, a factor which is very unpleasant in large-scale production. Another disadvantage of this process for the production of the 3,5-dioxyphenyl-alkanol-amine derivatives is that it is very difficult to obtain the 3,5-dioxy-ω-halogenaceto-phenones because, contrary to what occurs with the 3,4-substituted compounds. the synthesis based on the Friedel-Crafts reaction cannot be used with the 3,5-substituted compounds.

It has now suprisingly been found that N-substituted phenyl-ethanol-amine derivatives having the general formula:

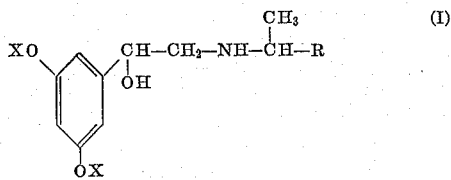

(I)

in which X is a hydrogen atom or an aliphatic acyl group having 2 to 6 carbon atoms and R is an alkyl group having 1 to 6 carbon atoms, can be prepared much more simply and rapidly than heretofore and avoiding the production of ω-halogen-acetophenones as intermediate products, for it has been found that Formula I compounds in which X is an acyl group can be produced in a single step if an acyl cyanide having the general formula

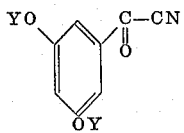

(II)

in which Y is an aliphatic acyl group having from 2 to 6 carbon atoms, is reduced catalytically, using a noble metal catalyst, in a weekly acid solution in the presence of a ketone having the general formula:

(III)

in which R has the meaning given above. In the process according to the invention, therefore, the cyano group is converted into the $CH_2$—$NH_2$ group, the $CH_2$—$NH_2$ group is alkylated by reducing action with the Formula III ketone, and the keto group is reduced to carbinol, all reactions in a single working step. The only event requiring subsequent treatment is the splitting, if desired, of the acyloxy groups present in reaction product. The Formula I bases can be isolated either as they are or in the form of salts.

Very good results are achieved if platinum oxide is used as the catalyst and the reaction is performed in a lower aliphatic carboxylic acid, preferably glacial acetic acid, as solvent. The acyloxy groups present in the nucleus are split off by conventional treatment, for instance, by treatment with alkali liquors, alkali carbonates, alkali bicarbonates or ammonia in aqueous solution. Very advantageously, the acyloxy groups are separated by treatment with lower alcohols in the presence of mineral acid, preferably hydrochloric acid. The fact that this variant, which also forms part of the invention, is successful is very surprising, for Adrenalin is, of course, converted by the action of an alcohol and hydrochloric acid into Adrenalin-α-O-alkyl ether, whereas there is absolutely no O-alkylation of the aliphatic hydroxyl group in the 3,5-dioxy-compounds.

It has also been found advantageous in the process if the Formula III ketone is used in stoichiometric excess with respect to the Formula II acyl-cyanide.

The best way of isolating the diacylated phenyl alkanol amines from the reaction solution resulting from the hydrogenation is in the form of the readily crystallising salts. If an aliphatic carboxylic acid is used as solvent for the hydrogenation, the salts of the phenyl alkanol amines are yielded directly after concentration, together with these acids. The same can then be converted into the salts in a conventional manner by using other acids. As such salts there can be mentioned, for instance, in addition to the salts of lower carboxylic acids, the hydrohalides, the nitrates, the sulphates, the hydrosulphates and the cyclohexylsulphamates. It is possible to use the salts of all those acids which have no toxic effect on human beings. Hydrogenation in the presence of benzyl halides, which split up into toluene and hydrogen halide with absorption of water, has proved very satisfactory in the preparation of the hydrohalides. The non-acylated Formula I compounds can be converted into salts in the same way.

The Formula II acyl cyanides can be prepared by known methods. It is very advantageous to use the methods involving reaction of the corresponding acid chlorides with CuCN at elevated temperature. The acyl cyanides, which can be reached in this way with a satisfactory yield, are thoroughly crystallized and can be distilled in a high vacuum without appreciable decomposition. Any free hydroxyl groups which are present in the acids used for the acyl cyanides must be acylated before the preparation of the acid chlorides and reaction with CuCN.

The process according to the invention forms a novel and improved process for the preparation of the known active compound d,l-1-(3',5'-dioxyphenyl)-2-isopropyl-amino-ethanol-(1) which has a marked broncholytic action and which, because of its stimulating action on the pulse rate, can be used to control some forms of cardiac arrhythmia. The substance also has a hypotension-producing action.

The process according to the invention can also be used in the preparation of novel diacylated-phenyl-ethanol-amines having the general formula:

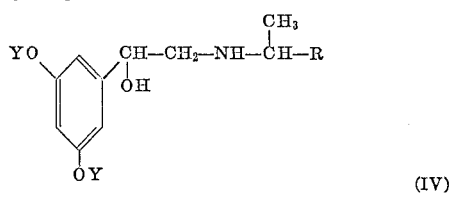

(IV)

in which Y and R have the same meaning as given above. These amines have very valuable properties.

These novel diacylated-phenyl-ethanol-amines also have a marked broncholytic action but, in comparison with the non-acylated compounds, doses having the same broncholytic activity affect the pulse rate less in the case of the novel compounds than in the case of the non-acylated compounds, and this is useful in asthmatic disorders where an increased pulse rate is very undesirable.

The novel diacylated-phenyl-ethanol-amines also have a hypotension-producing effect which lasts much longer than the same effect produced by the non-acylated compounds. For instance, the compounds d,l-1,(3',5'-diacetoxyphenyl) - 2 - (α-methyl) - propylaminoethanol-(1)-hydrochloride and d,l-1 - (3',5'-diacetoxyphenyl)-2-(α-methyl)-n-amylamino-ethanol - (1)-hydrochloride have, when given in equidepressant doses, an action lasting for about 2.5 times as long as is provided by the non-acylated compound d,l - 1 - (3',5'-dioxyphenyl)-2-isopropylamino-ethanol-(1), an effect due to the deposit effect of the substances according to the invention.

Also, esterification of the hydrophilic phenolic OH—groups leads to improved lipoid solubility, so that improved resorption when administered via the mouth is provided as compared with the compounds which have not been acylated in positions 3 and 5.

The following examples illustrate the invention. The parts mentioned in the examples are parts by weight.

*Example 1*

0.70 part of platinum oxide is hydrogenated in glacial acetic acid whereafter, with continuation of the hydrogenation, a solution of 5.0 parts of 3,5-diacetoxybenzoyl cyanide in glacial acetic acid, mixed with 11.6 parts of acetone, is slowly dripped in at 20° C. Hydrogenation is terminated after absorption of 4 mols of hydrogen. The catalyst is separate by filtration, the filtrate is mixed with 2.56 parts of benzyl chloride, and the filtrate is hydrogenated, with palladium carbon as catalyst, until the uptake of hydrogen is terminated. After separation of the catalyst the colourless filtrate is inspissated in vacuo to about 50 parts, mixed with ether until turbid, and the crystallisation is completed by cooling. After suction and drying treatment 5.50 parts of d,l-1-(3',5'-diacetoxyphenyl) - 2 - isopropyl-aminoethanol(1)-hydrochloride, or 81.8% of the theoretical value are obtained. The substance can be further purified by being reprecipitated from glacial acetic acid ether and then has a melting point of from 167° to 170° C.

3.30 parts of d,l-1-(3',5'-diacetoxyphenyl)-2-isopropyl-aminoethanol-(1)-hydrochloride are dissolved in 40 parts of methanol, mixed with 5.9 parts of concentrated hydrochloric acid and kept at ambient temperaure for 24 hours, whereafter the solvent is distilled off at a low temperature in vacuo, and the residue is redistilled to remove the water with ethanol/benzene. The oily residue is then dissolved in a little ethanol, mixed with ether until the turbidity remains constant, seeded and left to stand. The precipitated crystallisate is filtered off and dried. 2.0 parts of d,l-1 - (3',5'-dioxyphenyl)-2-isopropyl-amino-ethanol- (1)-hydrochloride, or 81.17% of the theoretical value, are obtained. The crude substance can be purified by reprecipitation from an ethanol and ether mixture and then has a micro melting point of from 180° to 182° C.

The 3,5-diacetoxybenzoyl cyanide required as feed can be prepared by reaction of 3,5-diacetoxybenzoyl chloride with CuCN at 180° C. with exclusion of moisture during the reaction. The melting point of the feed substance is from 115° to 118° C.

*Example 2*

5.0 parts of 3,5-bis-(propionyloxy)-benzoyl cyanide are dissolved in 100 parts of propionic acid, 3.20 parts of acetone are added, and the mixture is introduced slowly by dripping, in a hydrogen atmosphere, to a hydrogenated suspension of 0.70 part of platinum oxide in propionic acid. The reaction is completed after 4 mols of hydrogen have been taken up. The catalyst is filtered off, the filtrate is mixed with 2.30 parts of benzyl chloride and a little palladinum carbon, and the filtrate is hydrogenated until termination of the take-up of hydrogen. After filtering off of the catalyst, the colourless filtrate is inspissated in vacuo at a low temperature and seeded, and the resulting crystallisate is sucked off after some time. The yield is 4.60 parts of d,l-1-(3',5'-dipropionyloxyphenyl)-2-isopropylamino-ethanol-(1)-hydrochloride, or 70.38% of the theoretical value. The substance can be precipitated from propionic acid and ether to be further purified and then has a micro melting point of from 151° to 152° C. The 3,5-bis-(propionyloxy)-benzoyl cyanide can be prepared by the reaction of 3,5-bis-(propionyloxy)-benzoyl chloride with CuCN at 180° C. and has a melting point of from 91° to 93° C.

*Example 3*

0.70 part of platinum oxide is hydrogenated in glacial acetic acid, whereafter, in a hydrogen atmosphere, a solution of 5.0 parts of 3,5-diacetoxy-benzoyl cyanide and 14.6 parts of methyl-ethyl ketone in glacial acetic acid is introduced by dripping with agitation. The reaction stops after 4 mols of hydrogen have been taken up. The catalyst is separated, the filtrate is mixed with 2.56 parts of benzyl chloride, and the filtrate is hydrogenated, after the addition of a little palladium carbon, until the take-up of hydrogen is completed. The catalyst is filtered off and the glacial acetic acid is distilled off in vacuo at a low temperature. The residue is taken up in acetone and filtered, the filtrate is mixed with ether until turbidity is constant, whereafter the filtrate is cooled and the precipitated crystallisate is sucked off after several hours. The yield is 4.6 parts of d,l-1-(3',5'-diacetoxyphenyl)-2-(α-methyl) - propylamino-ethanol-(1)-hydrochloride, or 65.9% of the theoretical value. The crude substance can be purified by being reprecipitated from glacial acetic acid and ether and then has a melting point of 145° to 150° C.

The following products are prepared similarly.

*Example 4*

From 3,5-diacetoxybenzoyl cyanide and methyl-propyl-ketone, d,l-1-(3',5'-diacetoxyphenyl) - 2 - (α-methyl)-n-butylamino-ethanol-(1)-hydrochloride having a melting point of 133° to 135° C.

*Example 5*

From 3,5-diacetoxybenzoyl cyanide and methyl-butyl-ketone, d,l-1-(3',5'-diacetoxyphenyl) - 2 - (α-methyl)-n-amylamino-ethanol-(1)-hydrochloride having a melting point of 146° to 148° C.

*Example 6*

From 3,5-dibutyryloxybenzoyl cyanide and methyl-ethyl-ketone, d,l-1-(3',5'-dibutyryl-oxy-phenyl) - 2 - (α- methyl) - propylamino-ethanol-(1)-hydrochloride having a melting point of 105° to 108° C.

*Example 7*

From 3,5-diacetoxybenzoyl cyanide and methyl-isopropyl ketone, d,l-1-(3',5'-diacetoxyphenyl) - 2 - (α,β-dimethyl)-n-propyl-amino-ethanol - (1)-hydrochloride having a melting point of from 148° to 157° C.

We claim:

1. A salt of a non-toxic acid and a diacylated phenyl ethanolamine derivative of the formula

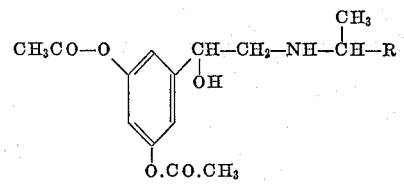

wherein R is an alkyl group containing 1 to 6 carbon atoms.

2. d,l-1-(3',5'-diacetoxyphenyl) - 2 - isopropylamino-ethanol-(1)-hydrochloride.

3. d,l-1-(3',5' - diacetoxyphenyl)-2-(α-methyl)-propyl-amino-ethanol-(1)-hydrochloride.

4. d,l-1-(3',5' - diacetoxyphenyl)-2-(α-methyl)-n-amyl-amino-ethanol-(1)-hydrochloride.

References Cited by the Examiner
FOREIGN PATENTS
789,033    1/58    Great Britain.

OTHER REFERENCES

Corrigan et al.: Journal of the American Chemical Society, vol. 71, pages 530–531 (1949).

Dornow et al.: Chemische Berichte, vol. 88, pages 1267–1275 (1955).

Fieser et al.: Advanced Organic Chemistry, Reinhold Publishing Corp., New York, page 497 (1961).

LORRAINE A. WEINBERGER,
*Acting Primary Examiner.*

LEON ZITVER, *Examiner.*